United States Patent
Segawa et al.

(10) Patent No.: US 7,150,196 B2
(45) Date of Patent: Dec. 19, 2006

(54) ELECTROMAGNETIC VALVE AND MOUNTING METHOD THEREOF

(75) Inventors: Taro Segawa, Kariya (JP); Hiroyuki Shinkai, Kariya (JP); Masahiko Kamiya, Kariya (JP); Hidenobu Kajita, Kariya (JP); Shinichi Tsujimura, Kariya (JP)

(73) Assignee: Advics Co., Ltd., Aichi-pref (JP)

( * ) Notice: Subject to any disclaimer, the term of this patent is extended or adjusted under 35 U.S.C. 154(b) by 20 days.

(21) Appl. No.: 11/137,369

(22) Filed: May 26, 2005

(65) Prior Publication Data

US 2005/0274192 A1   Dec. 15, 2005

(30) Foreign Application Priority Data

Jun. 11, 2004   (JP)   ............................. 2004-173953

(51) Int. Cl.
*F16K 31/02* (2006.01)
(52) U.S. Cl. .................... 73/722; 251/129.15; 137/15.8
(58) Field of Classification Search ........... 137/596.17, 137/15.8; 251/129.15, 129.17; 73/722
See application file for complete search history.

(56) References Cited

U.S. PATENT DOCUMENTS

| | | | | |
|---|---|---|---|---|
| 4,763,872 | A | * | 8/1988 | Ichihashi et al. ...... 251/130.01 |
| 4,860,792 | A | * | 8/1989 | Ichihashi et al. ...... 137/596.17 |
| 6,209,970 | B1 | * | 4/2001 | Kamiya et al. ......... 303/119.2 |
| 6,364,431 | B1 | * | 4/2002 | Yabuki et al. .......... 303/119.2 |
| 6,527,249 | B1 | * | 3/2003 | Niimi et al. ........... 251/129.15 |
| 6,546,945 | B1 | * | 4/2003 | Ishigaki et al. .......... 137/15.18 |
| 6,672,562 | B1 | * | 1/2004 | Kato .................... 251/129.17 |
| 6,745,634 | B1 | | 6/2004 | Beck et al. |
| 2005/0006951 | A1 | * | 1/2005 | Schwarzer et al. ...... 303/119.2 |

* cited by examiner

*Primary Examiner*—Edward Lefkowitz
*Assistant Examiner*—Andre Allen
(74) *Attorney, Agent, or Firm*—Posz Law Group, PLC

(57) ABSTRACT

If a pressure sensor is increased in size and therefore the inside diameter of a yoke is increased, a stopper is provided with a large-diameter portion. The large-diameter portion makes it possible to reduce the air gap between the stopper and the yoke and therefore suppress an increase in magnetic resistance. Besides, a magnetic circuit member is provided at an outer peripheral side of a sleeve. The magnetic circuit member makes it possible to reduce the air gap between the yoke and an armature and therefore suppress an increase in magnetic resistance.

9 Claims, 4 Drawing Sheets

ELECTROMAGNETIC VALVE AND MOUNTING METHOD THEREOF

CROSS REFERENCE TO RELATED APPLICATION

This application is based upon and claims the benefit of Japanese Patent Application No. 2004-173953 filed on Jun. 11, 2004, the content of which are incorporated herein by reference.

FIELD OF THE INVENTION

The present invention relates to an electromagnetic valve integrated with a pressure sensor, which is suitable for use in, for example, a brake fluid pressure control valve provided in a brake conduit of a vehicular brake unit.

RELATED ART OF THE INVENTION

A known related electromagnetic valve integrated with a pressure sensor is an electromagnetic valve in which a pressure sensor is attached to an end surface of a stopper (see, for example, Japanese Translation of PCT International Application No. 2003-522677).

In an electromagnetic valve as described above which is used in a vehicular brake unit, a coil of the electromagnetic valve is connected to a circuit board of an ECU (electronic control unit) in order to allow the ECU and a hydraulic unit to be separated from each other.

In order to separate between the ECU and the hydraulic unit, the electromagnetic valve is made up of a coil subassembly in which a coil is housed in a yoke, and a valve portion subassembly that is made up mainly of a stopper, an armature, etc., and that opens and closes a fluid passage. When an electromagnetic valve is to be assembled, the valve portion subassembly integrated with a pressure sensor is secured to a housing of the hydraulic unit, and then the valve portion subassembly is covered with the coil subassembly. Therefore, the inside diameter of the yoke needs to be larger than the maximum outside diameters of the pressure sensor, stopper, etc.

However, although there is no substantial problem if the pressure sensor has a smaller outside diameter than the stopper as in the electromagnetic valve disclosed in the aforementioned PCT International Application, a problem occurs in the case where the pressure sensor is increased in size so as to have a larger outside diameter than the stopper. That is, a large air gap between the stopper and the yoke results because the inside diameter of the yoke needs to be larger than the outside diameter of the pressure sensor. Therefore, the magnetic resistance increases, and the performance of the electromagnetic valve deteriorates.

In order to eliminate the air gap, the outside diameter of the valve portion subassembly may be increased. However, since it needs to set component parts separately for the case of a valve portion subassembly equipped with a large-size pressure sensor and the other cases, the number of kinds of component parts will increase, leading to a possibility of cost increase.

SUMMARY OF THE INVENTION

In view of the foregoing circumstances, it is an object of the present invention to make it possible to suppress the increase in magnetic resistance even in the case where the pressure sensor is increased in size.

In an electromagnetic valve according to a first aspect of the present invention, the maximum outside diameter of a stopper is larger than the maximum outside diameter of a sleeve, and is smaller than the minimum inside diameter of a yoke.

Hence, even if the pressure sensor is increased in size, the air gap between the stopper and the yoke can be reduced and therefore an increase in magnetic resistance can be suppressed.

The component parts, such as the sleeve, the armature, etc., can be the same as the component parts of an electromagnetic valve incorporating a small-size pressure sensor or of a small-diameter electromagnetic valve not provided with a pressure sensor.

Furthermore, since there is no need to increase the size of a portion that is secured to the housing of a hydraulic unit, the hydraulic unit as a whole can be reduced in size, weight, and cost.

In this construction, the maximum outside diameter of the stopper may be substantially equal to the minimum inside diameter of the yoke.

Due to the maximum outside diameter of the stopper, the air gap between the stopper and the yoke can be reduced, and an increase in magnetic resistance can be suppressed.

For example, in the first aspect of the present invention, the electromagnetic valve may further have a tubular sensor cover that houses the pressure sensor, at another end side of the stopper, and the maximum outside diameter of the sensor cover may be larger than the maximum outside diameter of the sleeve.

Therefore, the foregoing advantages of the first aspect of the invention can still be achieved if the electromagnetic valve incorporates a sensor case provided with a signal processing circuit or the like.

The sensor cover may be made of a magnetic material, and the sensor cover may be disposed between the yoke and the stopper.

Due to the magnetic material-made sensor cover, the air gap between the stopper and the yoke can be reduced, and an increase in magnetic resistance can be suppressed.

Furthermore, due to the construction in which the sensor cover extends into the main body of the electromagnetic valve, the entire length of the electromagnetic valve is reduced.

The maximum outside diameter of the sensor cover may be smaller than the minimum inside diameter of the yoke.

Therefore, it becomes possible to mount a coil subassembly to a valve portion subassembly integrated with a pressure sensor.

Furthermore, in the first aspect of the present invention, a magnetic material-made tubular magnetic circuit member that magnetically connects the yoke and the armature may be disposed between the yoke and the sleeve.

Due to the magnetic circuit member, the air gap between the armature and the yoke can be reduced, and an increase in magnetic resistance can be suppressed.

In this case, the magnetic circuit member may be joined to the sleeve.

Since the magnetic circuit member is joined to the sleeve and is therefore positioned, the magnetic circuit member can be reliably disposed at a predetermined position between the yoke and the armature.

The maximum outside diameter of the sensor cover and the maximum outside diameter of the stopper may be smaller than the maximum outside diameter of the magnetic circuit member.

Therefore, when the coil subassembly is to be mounted onto the valve portion subassembly, the end side portion of the valve portion subassembly which initially enters into the coil subassembly is relatively smaller in diameter. Hence, the coil subassembly can easily be mounted.

Still further, in the first aspect of the present invention, the stopper may have a first magnetic circuit portion that attracts the armature when the coil is energized, a second magnetic circuit portion that magnetically connects the yoke and the armature, and a non-magnetic portion provided between the first magnetic circuit portion and the second magnetic circuit portion.

If the magnetic circuit member is joined to the sleeve as mentioned above, a mounting method for an electromagnetic valve can be adopted in which the magnetic circuit member is joined to the sleeve, and then the sleeve and the stopper are joined while the magnetic circuit member is held.

Since the sleeve is not held when the sleeve and the stopper are joined together in this method, the method substantially avoids deformation of the sleeve, which has a thin wall and low strength.

BRIEF DESCRIPTION OF THE DRAWINGS

Other objects, features and advantages of the present invention will be understood more fully from the following detailed description made with reference to the accompanying drawings. In the drawings.

DETAILED DESCRIPTION OF THE PREFERRED EMBODIMENTS

Figure 1:
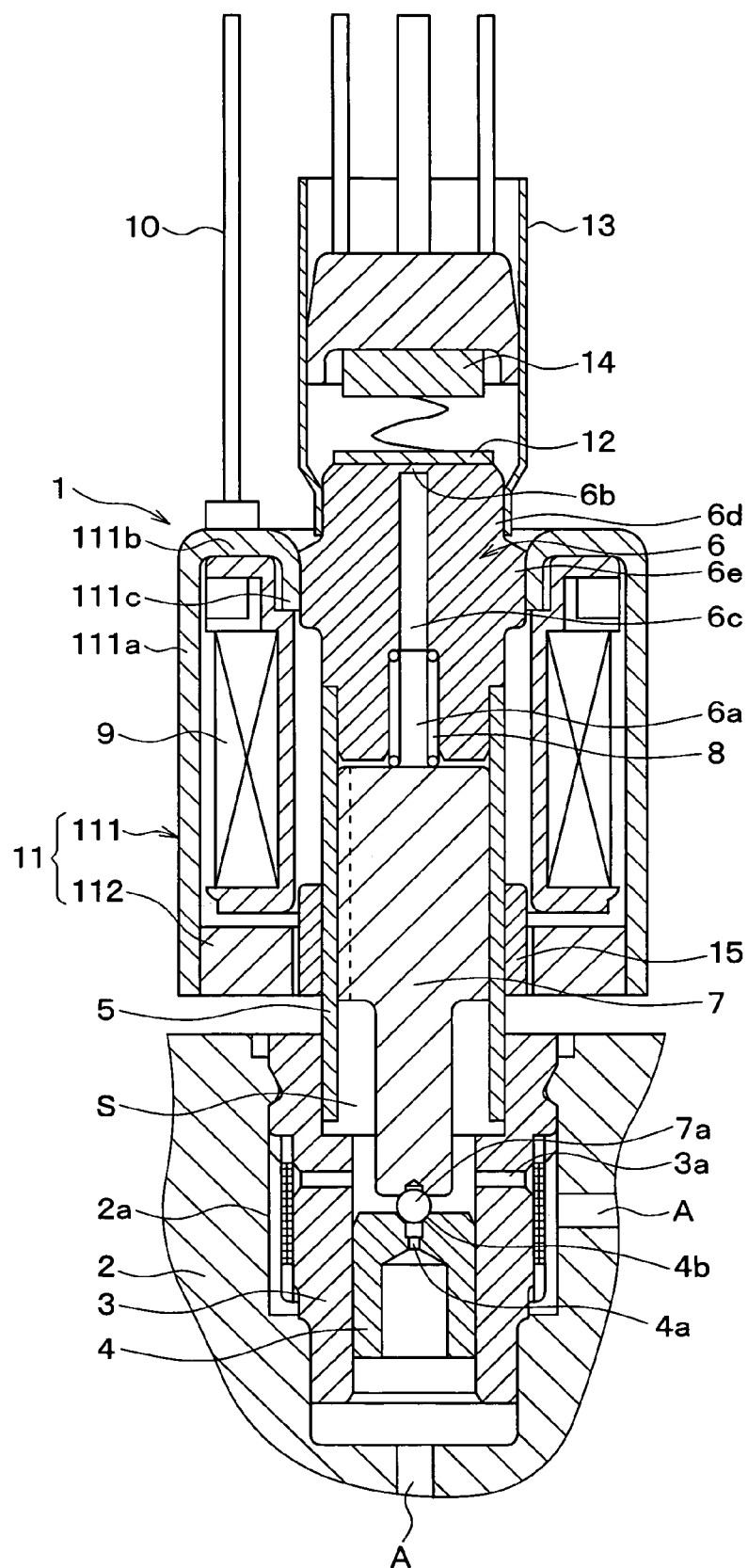
FIG. 1 is a sectional view showing an overall construction of an electromagnetic valve in accordance with a first embodiment of the present invention.

The present invention will be described further with reference to various embodiments in the drawings.

(First Embodiment)

An electromagnetic valve in accordance with a first embodiment of the present invention will be described. FIG. 1 is a sectional view showing an overall construction of an electromagnetic valve 1 in accordance with the first embodiment.

As shown in FIG. 1, the electromagnetic valve 1 is attached to, for example, a housing 2 of a hydraulic unit of an ABS actuator, and is used as a brake fluid pressure control valve that opens and closes a conduit A for brake fluid formed in the housing 2 in accordance with the state of electrification of a coil.

The electromagnetic valve 1 is equipped with a guide 3 formed of a magnetic metal into a tubular shape. A portion of the guide 3 is fitted into a recess portion 2a of the housing 2 of the ABS actuator. Then, by caulking a vicinity of an opening end of the recess portion 2a, a portion of the housing 2 is forced to enter a dent of the guide 3, so that the guide 3 is secured to the housing 2.

At the one-end side of the guide 3, a valve seat 4 formed of a metal into a tubular shape is pressed in. At another end side of the guide 3, a sleeve 5 made of a non-magnetic metal and having a thin-wall tube shape is pressed in. A bottomed tube-shape stopper 6 formed of a magnetic metal is pressed into the sleeve 5. Thus, the stopper 6 closes an end of a space S defined within the sleeve 5.

The space S communicates with the conduit A via a communicating hole 3a formed in a side face of the guide 3, and a communicating hole 4a formed in a diametrally central portion of the valve seat 4. In the space S, an armature 7 formed of a magnetic metal into a cylindrical shape is disposed. The armature 7 is held freely and slidably by the sleeve 5.

A spherical valve body 7a is secured to an end portion of the armature 7 on a side of a valve seat 4. An end portion of the communicating hole 4a of the valve seat 4 on a side of the space S has a taper valve seat face 4b that the valve body 7a contacts and departs.

A spring 8 is disposed in a spring hole 6a formed in the stopper 6. The spring 8 urges the armature 7 toward the side of the valve seat 4.

A coil 9 that forms a magnetic field when energized is disposed at an outer peripheral side of the sleeve 5 and the stopper 6. A terminal 10 extends out from the coil 9. Via the terminal 10, the coil 9 can be energized from outside.

The coil 9 is housed within a yoke 11 that is made up of a first frame member 111 and a second frame member 112. The first frame member 111 is made of a magnetic metal, and has a cup shape with a hole in its bottom portion. More specifically, the first frame member 111 has an outer tube portion 111a, a bottom portion 111b, and an inner tube portion 111c. The second frame member 112 is made of a magnetic metal, and has a ring shape.

A coil subassembly of the coil 9 and the yoke 11 integrated is obtained by inserting the coil 9 into the first frame member 111, and then pressing the second frame member 112 into an open end portion side of the first frame member 111.

An end portion of the stopper 6 has a thin-walled portion 6b that deforms in accordance with the brake fluid pressure. A pressure delivery hole 6c for delivering the brake fluid pressure from the space S to the thin-walled portion 6b is formed within the stopper 6.

The thin-walled portion 6b of the stopper 6 is provided with a pressure sensor 12 that detects the brake fluid pressure in the space S on the basis of the amount of deformation of the thin-walled portion 6b. The pressure sensor 12 used in this embodiment is a semiconductor strain gage based pressure sensor whose resistance value is variable in accordance with stress.

The stopper 6 has, in its end portion, an end-side tube portion 6d whose outside diameter is larger than the maximum outside diameter of the sleeve 5. A sensor cover 13 formed of a metal or resin into a thin-walled tubular shape is attached to the end-side tube portion 6d. A signal processing circuit 14 that processes the signal from the pressure sensor 12 is disposed within the sensor cover 13.

The maximum outside diameter of the sensor cover 13 is larger than the maximum outside diameter of the sleeve 5. The maximum outside diameter of the sensor cover 13 is smaller than the minimum inside diameter of the yoke 11, that is, the inside diameter of the inner tube portion 111c and the inside diameter of the second frame member 112.

An outer periphery of the stopper 6 has a stepped configuration, and an outer peripheral portion of the stopper 6 has a large-diameter portion 6e whose outside diameter is largest in the stopper 6, at a position that faces the inner tube portion 111c of the first frame member 111. The outside diameter of the large-diameter portion 6e is larger than the maximum outside diameter of the sleeve 5, and is smaller than the inside diameter of the inner tube portion 111c and the inside diameter of the second frame member 112. However, the outside diameter of the large-diameter portion 6e is substantially equal to the inside diameters of the inner tube portion 111c and the second frame member 112, and more specifically, is slightly smaller than the inside diameters of the inner tube portion 111c and the second frame member 112.

A tubular magnetic circuit member 15 made of a magnetic metal is joined to an outer peripheral portion of the sleeve 5 by press fitting, welding, etc. The magnetic circuit member 15 is at a position that is on an outer peripheral side of the armature 7 and that faces the second frame member 112. The magnetic circuit member 15 magnetically connects the armature 7 and the second frame member 112.

If the outside diameter of the magnetic circuit member 15 is made substantially equal to the inside diameter of the second frame member 112, the air gap between the yoke 11 and the armature 7 is reduced so that an increase in magnetic resistance can be suppressed.

Furthermore, if the outside diameter of the magnetic circuit member 15 is made smaller than the inside diameter of the second frame member 112 within an extent that has substantially no effect of increasing the magnetic resistance, an easy-to-assemble structure can be provided in which the coil subassembly can easily be mounted without being scratched on the magnetic circuit member 15.

Incidentally, if after the sleeve 5 is joined to the magnetic circuit member 15, the guide 3 and the stopper 6 are joined to the sleeve 5 by holding the magnetic circuit member 15, it is possible to avoid deformation of the sleeve 5, which has a thin wall and low strength.

In the electromagnetic valve 1 constructed as described above, when the coil 9 is not energized, the armature 7 is urged toward the side of the valve seat 4 by the elastic force of the spring 8 as shown in FIG. 1 so that the valve body 7a sits on the valve seat face 4b of the valve seat 4, thereby closing the conduit A.

On the other hand, when the coil 9 is energized, the coil 9 forms a magnetic field, so that a magnetic path is formed by the stopper 6, the armature 7, etc. Therefore, due to magnetic attraction force, the armature 7 is attracted toward the side of the stopper 6, so that the armature 7 moves against the force of the spring 8. Hence, the armature 7 assumes a state where the valve body 7a is apart from the valve seat face 4b of the valve seat 4, so that the conduit A is in a state of communication via the communicating holes 3a, 4a and the space S.

In this embodiment, even if the pressure sensor 12 is increased in size, the large-diameter portion 6e of the stopper 6 makes it possible to reduce the air gap between the stopper 6 and the yoke 11 and therefore suppress an increase in magnetic resistance. Besides, the magnetic circuit member 15 makes it possible to reduce the air gap between the yoke 11 and the armature 7 and therefore suppress an increase in magnetic resistance.

The component parts, such as the guide 3, the valve seat 4, the sleeve 5, the armature 7, etc., can be the same as the component parts of a small-diameter electromagnetic valve not provided with the pressure sensor 12, or of an electromagnetic valve incorporating a small-size pressure sensor.

Furthermore, since there is no need to increase the size of a portion that is secured to the housing 2 (i.e., the size of the guide 3), the hydraulic unit as a whole can be reduced in size, weight, and cost.

(Second Embodiment)

Figure 2:
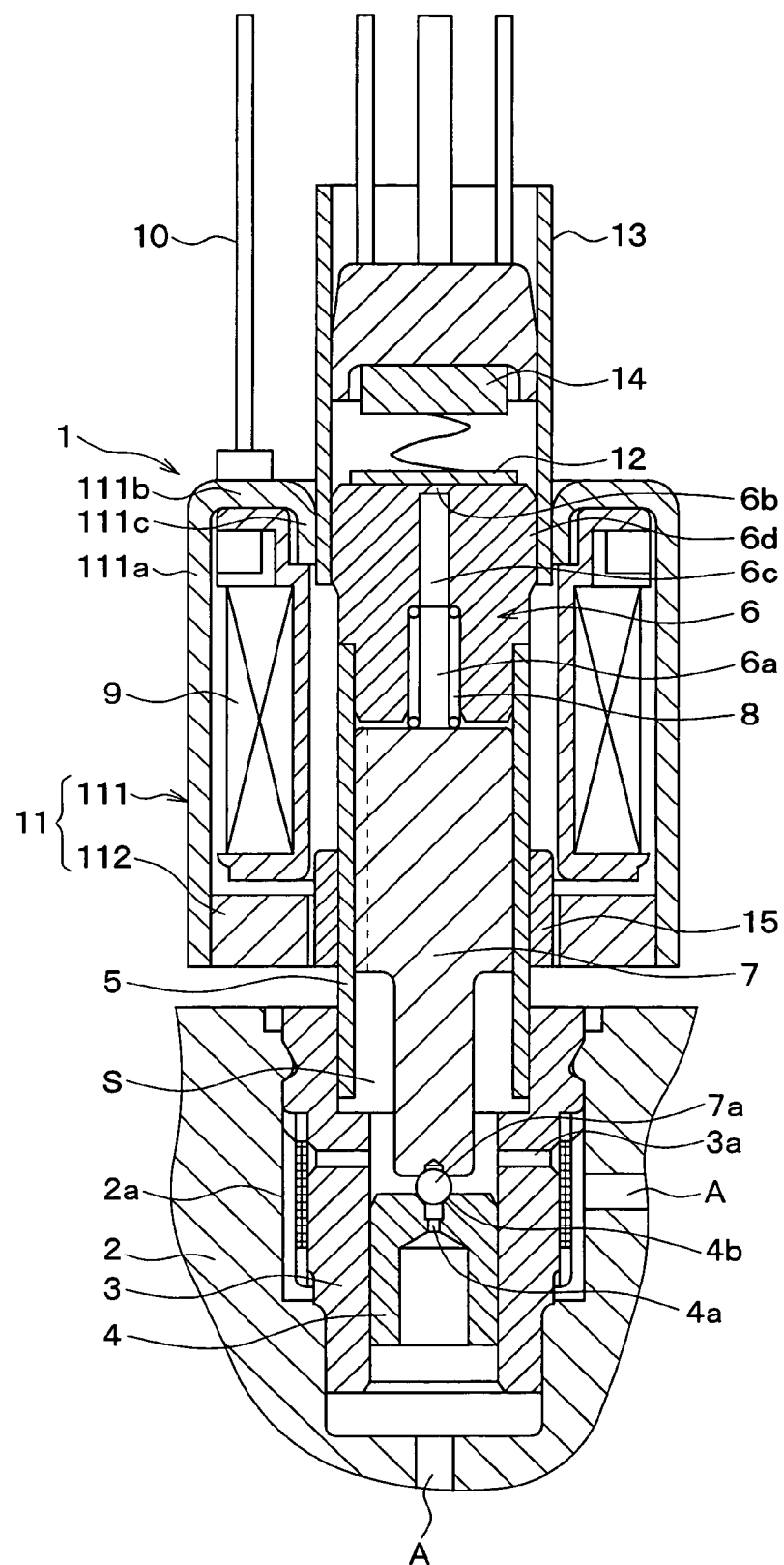
FIG. 2 is a sectional view showing an overall construction of an electromagnetic valve in accordance with a second embodiment of the present invention.

A second embodiment of the present invention will be described. FIG. 2 is a sectional view showing an overall construction of an electromagnetic valve in accordance with the second embodiment. The portions that are the same as or equivalent to those of the first embodiment are represented by the same reference numerals and characters, and will not be described again.

As shown in FIG. 2, a sensor cover 13 is made of a magnetic metal. An end-side tube portion 6d of a stopper 6 is inserted into and joined to an end of the sensor cover 13. The end of the sensor cover 13 and the end-side tube portion 6d of the stopper 6 are disposed at a position that faces an inner tube portion 111c of a first frame member 111 of a yoke 11. In other words, the end of the sensor cover 13 is disposed between the yoke 11 and the stopper 6.

This configuration forms a construction in which the sensor cover 13 extends into the main body of the electromagnetic valve. Therefore, the entire length of the electromagnetic valve is reduced.

Furthermore, the magnetic metal-made sensor cover 13 makes it possible to reduce the air gap between the stopper 6 and the yoke 11 and suppress an increase in magnetic resistance.

(Third Embodiment)

Figure 3:
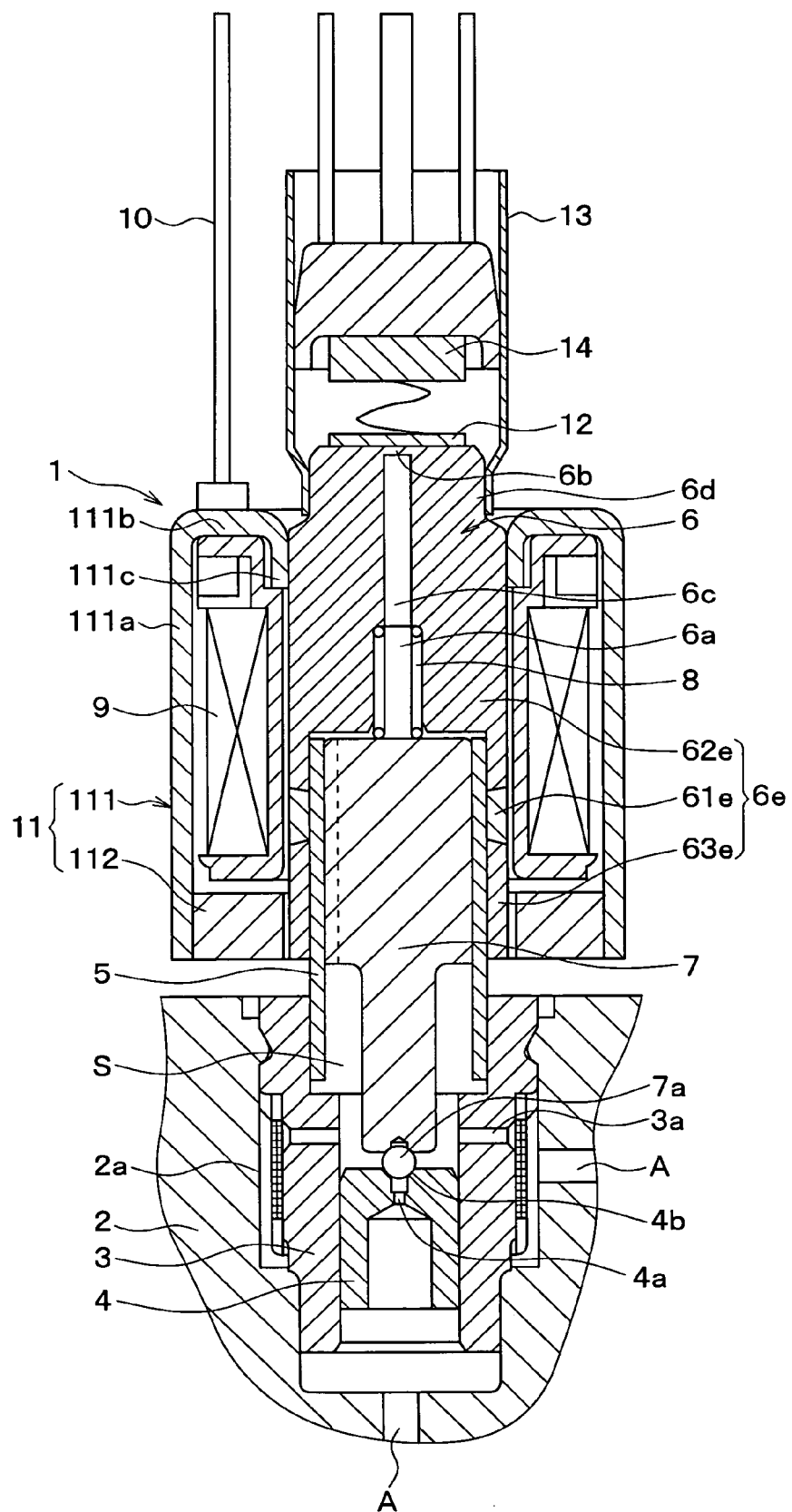
FIG. 3 is a sectional view showing an overall construction of an electromagnetic valve in accordance with a third embodiment of the present invention.

A third embodiment of the present invention will be described. FIG. 3 is a sectional view showing an overall construction of an electromagnetic valve in accordance with a third embodiment. The portions that are the same as or equivalent to those of the first embodiment are represented by the same reference numerals and characters, and will not be described again.

In this embodiment, a portion corresponding to the magnetic circuit member 15 in the first embodiment is provided integrally with a stopper 6.

As shown in FIG. 3, a large-diameter portion 6e of the stopper 6 extends in the direction of an axis to a position that faces a second frame member 112 of a yoke 11. After the stopper 6 is formed of a magnetic metal into a predetermined configuration, an intermediate portion of the large-diameter portion 6e is altered to a non-magnetic material, so that a non-magnetic portion 61e is provided.

A portion of the large-diameter portion 6e which is located on a side of the pressure sensor 12 of the non-magnetic portion 61e forms a first magnetic circuit portion 62e. This first magnetic circuit portion 62e faces an inner tube portion 111c of the first frame member 111. When the coil 9 is energized, the armature 7 is attracted to the first magnetic circuit portion 62e.

A portion of the large-diameter portion 6e which is located on a side of the guide 3 of the non-magnetic portion 61e forms a second magnetic circuit portion 63e. The second magnetic circuit portion 63e is at a position that is on an outer peripheral side of the armature 7 and that faces the second frame member 112. The second magnetic circuit portion 63e magnetically connects the armature 7 and the second frame member 112. The second magnetic circuit portion 63e corresponds to a magnetic circuit member in the present invention.

The first magnetic circuit portion 62e and the second magnetic circuit portion 63e are mechanically connected to each other, but are magnetically separated from each other by the non-magnetic portion 61e.

In this embodiment, even if the pressure sensor 12 is increased in size, the first magnetic circuit portion 62e of the stopper 6 makes it possible to reduce the air gap between the stopper 6 and the yoke 11 and therefore suppress an increase in magnetic resistance. Besides, the second magnetic circuit portion 63e of the stopper 6 makes it possible to reduce the air gap between the yoke 11 and the armature 7 and therefore suppress an increase in magnetic resistance.

The component parts, such as the guide 3, the valve seat 4, the sleeve 5, the armature 7, etc., can be the same as the component parts of a small-diameter electromagnetic valve not provided with the pressure sensor 12, or of an electromagnetic valve incorporating a small-size pressure sensor.

Furthermore, since there is no need to increase the size of a portion that is secured to the housing 2 (i.e., the size of the guide 3), the hydraulic unit as a whole can be reduced in size, weight and cost.

(Fourth Embodiment)

Figure 4:
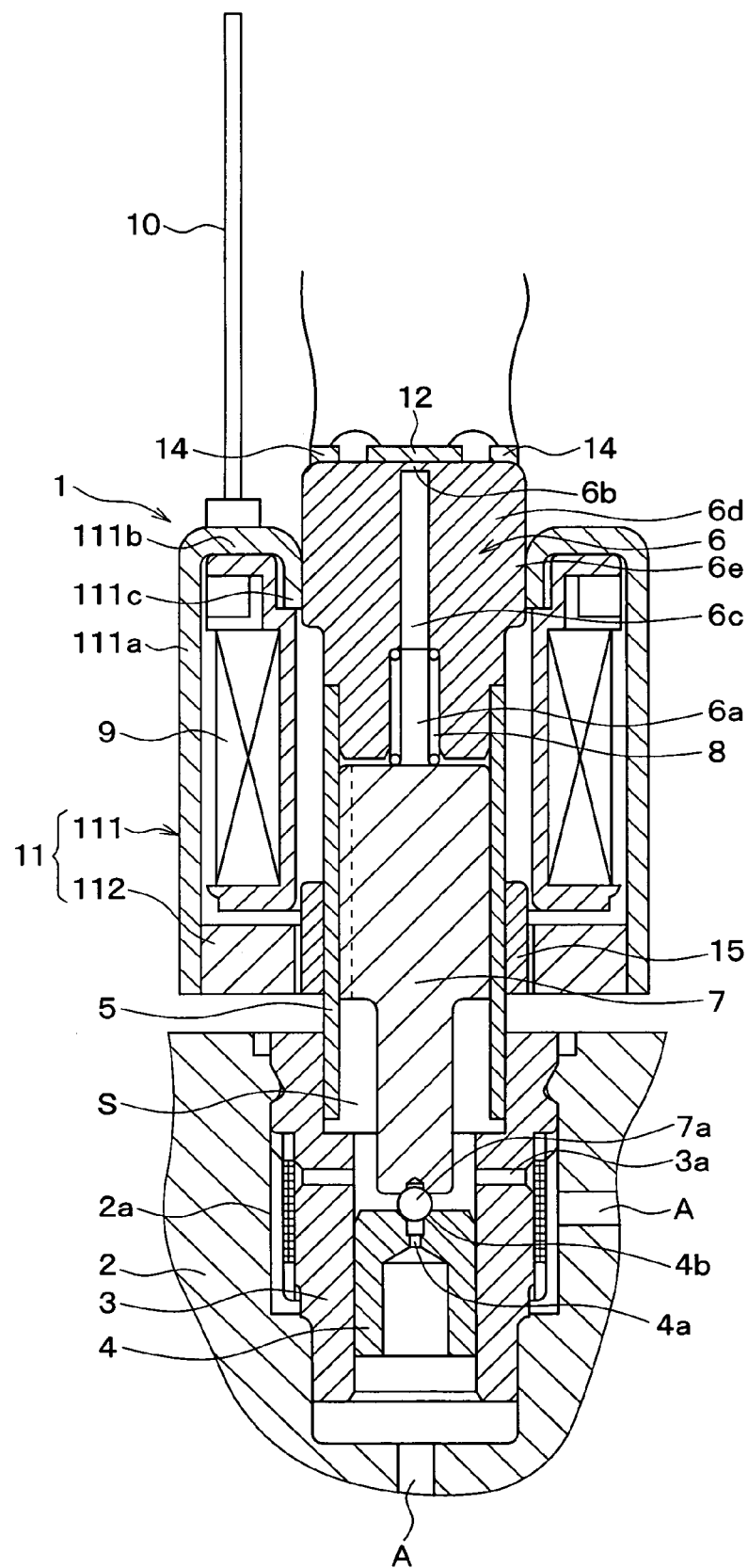
FIG. 4 is a sectional view showing an overall construction of an electromagnetic valve in accordance with a fourth embodiment of the present invention.

A fourth embodiment of the present invention will be described. FIG. 4 is a sectional view showing an overall construction of an electromagnetic valve in accordance with the fourth embodiment. The portions that are the same as or equivalent to those of the first embodiment are represented by the same reference numerals and characters, and will not be described again.

In the first embodiment, the pressure sensor 12 is disposed on the thin-walled portion 6b of the stopper 6, and the signal processing circuit 14 is attached to the sensor cover 13. In contrast, in the fourth embodiment, the pressure sensor 12 and the signal processing circuit 14 are disposed on a thin-walled portion 6b of a stopper 6, and a sensor cover 13 is omitted, as shown in FIG. 4. Incidentally, the signal processing circuit may be provided on a control-purpose circuit board.

(Other Embodiments)

Although in the foregoing embodiments, the pressure sensor 12 is a semiconductor strain gage based pressure sensor, the pressure sensor 12 may also be an electrostatic capacitance based pressure sensor, an optical fiber based pressure sensor, etc. The optical fiber based pressure sensor is a Fabry-Perot interference based sensor in which an interferometer is incorporated in a distal end portion thereof. In this sensor, the inside face of a silicon-made diaphragm is used as a mirror to make an interferometer pair with an end surface of an optical fiber, and the mirror interval (cavity length) is measured in wavelength of light, and is converted into a pressure value.

Although in the foregoing embodiments, description is made in conjunction with an N/C valve (normally closed valve), the invention is also applicable to N/O valves (normally open valves) in which the armature acts in the valve closing direction when the coil is energized.

Furthermore, in the foregoing embodiments, it is preferable that the maximum outside diameter of the sensor cover 13 and the maximum outside diameter of the stopper 6 be smaller than the maximum outside diameter of the magnetic circuit member 15.

Therefore, when the coil subassembly is to be mounted onto the valve portion subassembly, the end side portion of the valve portion subassembly which initially enters into the coil subassembly is relatively smaller in diameter. Hence, the coil subassembly can easily be mounted.

While the above description is of the preferred embodiments of the present invention, it should be appreciated that the invention may be modified, altered, or varied without deviating from the scope and fair meaning of the following claims.

What is claimed is:

1. An electromagnetic valve comprising:
    a coil that forms a magnetic field when energized;
    a magnetic material-made yoke that houses the coil;
    a tubular sleeve which is disposed at an inner peripheral side of the yoke and whose interior has a space;
    a magnetic material-made stopper having an end side that is joined to the sleeve and closes an end of the sleeve;
    a magnetic material-made armature that is disposed slidably in the space in the sleeve; and
    a pressure sensor that is attached to another end side of the stopper and that detects a pressure in the space in the sleeve,
    wherein a maximum outside diameter of the stopper is larger than a maximum outside diameter of the sleeve, and is smaller than a minimum inside diameter of the yoke.

2. The electromagnetic valve according to claim 1, wherein the maximum outside diameter of the stopper is substantially equal to the minimum inside diameter of the yoke.

3. The electromagnetic valve according to claim 1, further comprising a tubular sensor cover that houses the pressure sensor, at another end side of the stopper,
    wherein a maximum outside diameter of the sensor cover is larger than the maximum outside diameter of the sleeve.

4. The electromagnetic valve according to claim 3, wherein the sensor cover is made of a magnetic material, and the sensor cover is disposed between the yoke and the stopper.

5. The electromagnetic valve according to claim 3, wherein the maximum outside diameter of the sensor cover is smaller than the minimum inside diameter of the yoke.

6. The electromagnetic valve according to claim 1, wherein a magnetic material-made tubular magnetic circuit member that magnetically connects the yoke and the armature is disposed between the yoke and the sleeve.

7. The electromagnetic valve according to claim 6, wherein the magnetic circuit member is joined to the sleeve.

8. The electromagnetic valve according to claim 6, wherein the maximum outside diameter of the sensor cover and the maximum outside diameter of the stopper are smaller than a maximum outside diameter of the magnetic circuit member.

9. The electromagnetic valve according to claim 1, wherein the stopper comprises:
    a first magnetic circuit portion that attracts the armature when the coil is energized;
    a second magnetic circuit portion that magnetically connects the yoke and the armature; and
    a non-magnetic portion provided between the first magnetic circuit portion and the second magnetic circuit portion.

* * * * *